United States Patent
Bennett et al.

(10) Patent No.: US 6,970,319 B1
(45) Date of Patent: Nov. 29, 2005

(54) DISK DRIVE COMPRISING A PULSE WIDTH MODULATED DEMAND LIMIT CIRCUIT FOR ENHANCING POWER MANAGEMENT DURING SPIN-DOWN

(75) Inventors: George J. Bennett, Murrieta, CA (US); Robert P. Ryan, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 137 days.

(21) Appl. No.: 10/446,885

(22) Filed: May 27, 2003

(51) Int. Cl.[7] .............................................. G11B 21/02
(52) U.S. Cl. .......................................... 360/75; 360/69
(58) Field of Search ....................... 360/69, 75, 73.03, 360/77.05; 318/377, 280, 634

(56) References Cited

U.S. PATENT DOCUMENTS

| | | |
|---|---|---|
| 5,444,582 A | 8/1995 | Suzuki |
| 5,504,402 A | 4/1996 | Menegoli |
| 5,781,362 A | 7/1998 | Bang |
| 5,838,515 A | 11/1998 | Mortazavi et al. |
| 5,898,283 A | 4/1999 | Bennett |
| 6,542,324 B1 | 4/2003 | Galbiati et al. |
| 6,574,062 B1 * | 6/2003 | Bennett et al. ............... 360/69 |

* cited by examiner

Primary Examiner—David Hudspeth
Assistant Examiner—Jason Olson
(74) Attorney, Agent, or Firm—Howard H. Sheerin, Esq.

(57) ABSTRACT

A disk drive is disclosed comprising a head, a disk and a spindle motor for rotating the disk. An internal supply voltage is generated from a back EMF (BEMF) voltage across the windings of the spindle motor. The internal supply voltage is applied to a voice coil motor for use in parking the head during a spin-down mode. The internal supply voltage is compared to a threshold in order to activate a demand limit control signal. A periodic signal periodically disconnects the internal supply voltage from the VCM while the demand limit control signal is active.

18 Claims, 12 Drawing Sheets

DISK DRIVE COMPRISING A PULSE WIDTH MODULATED DEMAND LIMIT CIRCUIT FOR ENHANCING POWER MANAGEMENT DURING SPIN-DOWN

CROSS REFERENCE TO RELATED APPLICATIONS AND PATENTS

This application is related to U.S. Pat. No. 5,898,283 entitled "VOLTAGE FEED FORWARD CONTROL SYSTEM FOR A SPINDLE MOTOR OF A DISK DRIVE" issued on Apr. 27, 1999, the disclosure of which is incorporated herein by reference.

BACKGROUND OF THE INVENTION

1. Field of the Invention

The present invention relates to disk drives for computer systems. More particularly, the present invention relates to a disk drive comprising a pulse width modulated demand limit circuit for enhancing power management during spin-down.

2. Description of the Prior Art

When the disk spins down in a disk drive it is important to park the head before the air bearing dissipates to prevent damage to the head and/or the disk. In disk drives wherein the head is parked in a landing zone on the disk, it is also important to brake the spindle motor as quickly as possible to minimize head wear. Conventionally, when power is removed from the disk drive the head is parked using the back EMF (BEMF) voltage present in the spindle motor windings due to the angular momentum of the spindle and disk assembly. The current induced by the BEMF charges a capacitor to thereby generate an internal supply voltage with limited current capability. This internal supply voltage is applied to a voice coil motor (VCM) to park the head. Once the head is parked, a braking torque is applied to the spindle motor to stop it from rotating as quickly as possible in order to minimize head wear. This limited internal supply must provide enough current to allow all shutdown activities to take place, including the sequencer and controls necessary to make the shutdown events happen properly.

If the internal supply voltage drops below a certain threshold for an extended period of time during a power failure mode, the analog and digital circuitry which control the power down sequence may malfunction or shut down. This can typically occur if the VCM driver draws an excessive amount of current from the internal supply voltage. For example, if the head is in the middle of a seek operation when power failure occurs, the VCM driver may draw excessive current in order to decelerate the head. In another example, the VCM driver may draw excessive current in order to prevent the head from bouncing away from the parking latch at the end of the park operation. Either of these events may pull down the internal supply voltage beyond a safe level, thereby rendering the power down operation questionable.

This problem has been addressed in the prior art by designing disk drives with efficient spindle motors capable of providing sufficient BEMF voltage and current during power failure. However, this increases the overall cost of the disk drive since the design restrictions on the spindle motor both raise its costs and put stringent requirements on the design of the rest of the disk drive.

Another known technique which alleviates this problem is to employ a "boost" circuit for "boosting" the internal supply voltage by periodically shorting the spindle motor windings. For example, U.S. Pat. No. 5,504,402 discloses a boost circuit for boosting the internal supply voltage by periodically grounding the spindle motor windings using a grounding switch. When the grounding switch is periodically turned on (grounded), a current builds in the spindle motor windings due to the inductance and the BEMF. During the off or open portion of the periodic short cycle, the current stored in the spindle motor windings charges a capacitor which then provides a crudely filtered internal supply voltage. When the internal supply voltage reaches a predetermined level, the grounding switch is left off in order to prevent overcharging the capacitor to a voltage that is higher than needed. Although the boost circuit increases the available power so that less efficient spindle and VCM motors may be employed, further improvements are attainable.

Head wear is also reduced by unlatching the head early in the spin-up process after the spindle motor reaches a sufficient RPM to enable the head to fly over the disk. This means the heads are unlatched at about 60% of the operating RPM. Since power can be lost at any time, any RPM at which the heads are unlatched must also generate enough voltage and power to allow the heads to park.

Yet another problem identified with prior art disk drives during a normal spin-down operation is that the head is typically positioned over the landing zone on the disk while the disk is still rotating at a high RPM resulting in undesirable head wear. The landing zone is typically textured to reduce the stiction force during spin-up; however, this extremely hard textured surface also wears on the head during spin-down. Because prior art techniques position the head over the landing zone while the disk is still spinning at a high RPM, head wear increases due to the increased time to brake the spindle motor. The prior art boost circuit alleviates this problem somewhat by increasing the internal supply voltage, thereby enabling head parking at a lower RPM which reduces the braking time while the head is over the landing zone. However, further improvements are attainable.

Spindle motors designed to operate at a higher RPM will often be used in disk drives having a lower operating RPM. This creates a low voltage tolerance problem since the back EMF from the spindle motor is proportional to design RPM, not to actual operating RPM. Delaying head parking during spin-down using these reduced voltage spindle motors to minimize head wear causes additional sag in the internal supply voltage due to even lower RPM.

There is, therefore, a need to improve upon prior art techniques for generating an internal supply voltage used to park the head in a disk drive during spin-down. In particular, there is a need to protect against the internal supply voltage from dropping below a safe level in order to maintain proper operation of the digital and analog circuitry responsible for the power down sequence. Further, there is a need to improve power management so that head parking is viable at a lower RPM to reduce head wear.

SUMMARY OF THE INVENTION

The present invention may be regarded as a disk drive comprising a disk, a head, a voice coil motor (VCM) for actuating the head radially over the disk, the VCM having a control input, and a spindle motor for rotating the disk. The spindle motor comprises a plurality of windings and a rotor rotatable at a variable spin rate wherein the rotor generates a back EMF (BEMF) voltage across the windings proportional to the spin rate of the rotor. A plurality of switching elements are coupled to the windings and switch control logic generates switch control signals applied to the switching elements for commutating the spindle motor during normal operation and for generating an internal supply voltage from the BEMF voltage during a spin-down mode, the internal supply voltage applied to the control input of the VCM for parking the head. A demand limit circuit controls the amount of current drawn by the VCM from the internal supply voltage while parking the head. The demand limit circuit comprises a comparator for comparing the internal supply voltage to a threshold to activate a demand limit control signal, and a signal generator for generating a periodic signal for periodically disconnecting the internal supply voltage from the control input of the VCM while the demand limit control signal is active.

In one embodiment the periodic signal periodically switches the control input of the VCM between the internal supply voltage and ground.

In another embodiment, the comparator activates the demand limit control signal when the internal supply voltage falls below the threshold and deactivates the demand limit control signal when the internal supply voltage rises above the threshold.

In yet another embodiment, the comparator comprises hysteresis such that the demand limit control signal is activated when the internal supply voltage falls below a first threshold, and the demand limit control signal is deactivated when the internal supply voltage rises above a second threshold greater than the first threshold.

In another embodiment, the comparator deactivates the demand limit control signal when the internal supply voltage falls below the threshold and activates the demand limit control signal when the internal supply voltage rises above the threshold.

In yet another embodiment, the signal generator pulse width modulates the periodic signal in response to a programmable duty cycle value. In an alternative embodiment, the signal generator pulse width modulates the periodic signal in response to the internal supply voltage.

In still another embodiment, the windings of the spindle motor are periodically grounded in order to boost the internal supply voltage.

In yet another embodiment, the disk drive further comprises a voltage regulator responsive to the internal supply voltage for generating a regulated voltage, wherein the regulated voltage is applied to the control input of the VCM while the demand limit control signal is deactivated.

The present invention may also be regarded as a method of operating a disk drive. The disk drive comprises a disk, a head, a voice coil motor (VCM) for actuating the head radially over the disk, the VCM having a control input, and a spindle motor for rotating the disk. The spindle motor comprises a plurality of windings and a rotor rotatable at a variable spin rate wherein the rotor generates a back EMF (BEMF) voltage across the windings proportional to the spin rate of the rotor. A plurality of switching elements are coupled to the windings, and switch control logic generates switch control signals applied to the switching elements for commutating the spindle motor during normal operation and for generating an internal supply voltage from the BEMF voltage during a spin-down mode, the internal supply voltage applied to the control input of the VCM for parking the head. The internal supply voltage is compared to a threshold in order to activate and deactivate a demand limit control signal. A periodic signal is generated for periodically disconnecting the internal supply voltage from the control input of the VCM while the demand limit control signal is active.

DESCRIPTION OF THE PREFERRED EMBODIMENTS

Figure 1:
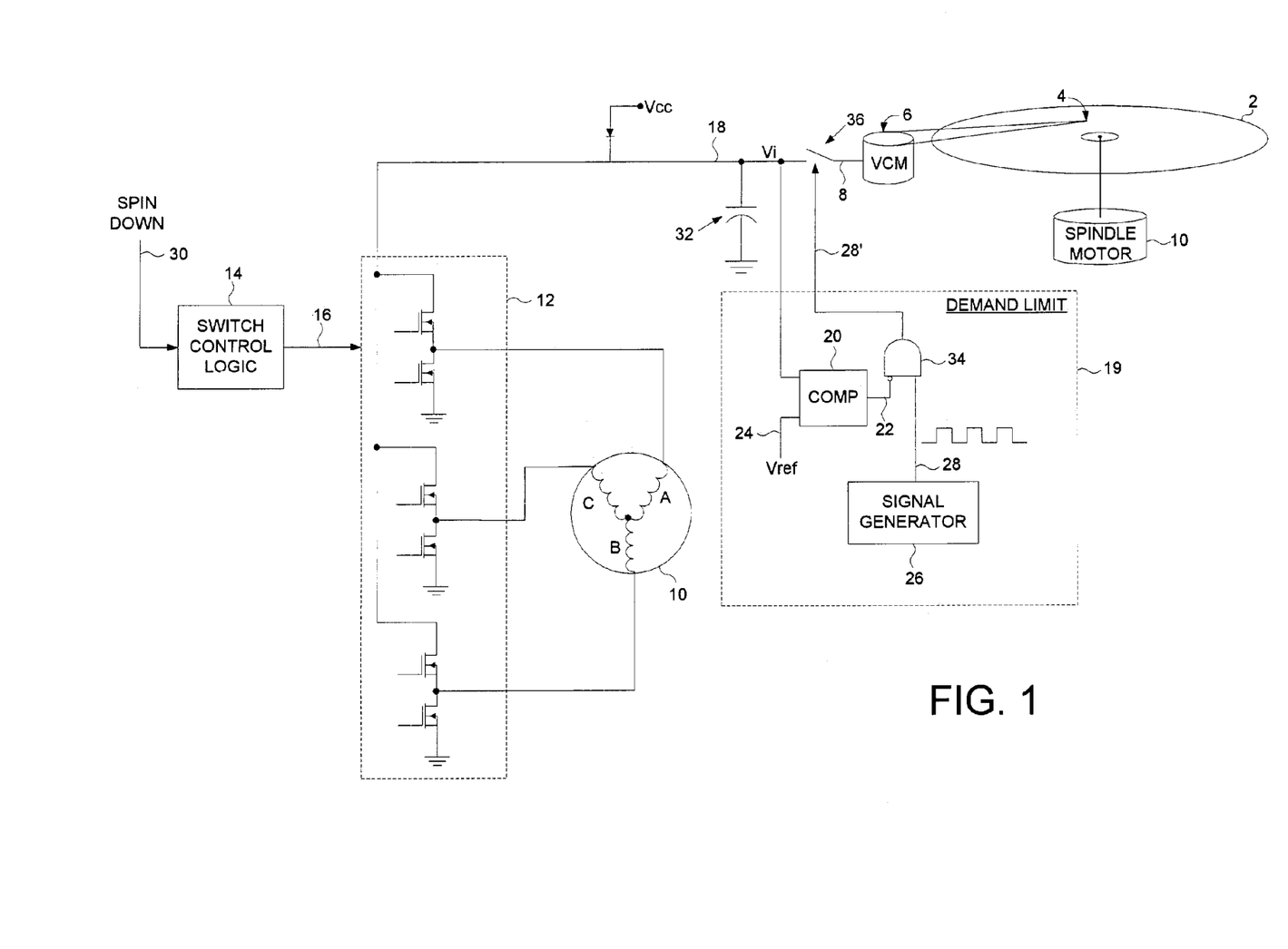
FIG. 1 shows a disk drive according to an embodiment of the present invention comprising a pulse width modulated (PWM) demand limit circuit for controlling the amount of current drawn by the VCM from an internal supply voltage during spin-down.

FIG. 1 shows a disk drive according to an embodiment of the present invention comprising a disk 2, a head 4, a voice coil motor (VCM) 6 for actuating the head 4 radially over the disk 2, the VCM 6 having a control input 8, and a spindle motor 10 for rotating the disk 2. The spindle motor 10 comprises a plurality of windings and a rotor rotatable at a variable spin rate wherein the rotor generates a back EMF (BEMF) voltage across the windings proportional to the spin rate of the rotor. A plurality of switching elements 12 are coupled to the windings and switch control logic 14 generates switch control signals 16 applied to the switching elements 12 for commutating the spindle motor 10 during normal operation and for generating an internal supply voltage (Vi) 18 from the BEMF voltage during a spin-down mode, the internal supply voltage 18 applied to the control input 8 of the VCM 6 for parking the head 4. A demand limit circuit 19 controls the amount of current drawn by the VCM 6 from the internal supply voltage 18 while parking the head 4. The demand limit circuit 19 comprises a comparator 20 for comparing the internal supply voltage 18 to a threshold 24 to activate a demand limit control signal 22. The demand limit circuit 19 further comprises a signal generator 26 for generating a periodic signal 28 for periodically disconnecting the internal supply voltage 18 from the control input 8 of the VCM 6 while the demand limit control signal 22 is active.

In the embodiment of FIG. 1, the demand limit control signal 22 enables AND gate 34 which outputs periodic signal 28' to periodically disconnect the internal supply voltage 18 from the control input 8 of the VCM 6 by toggling switch 36 (using any suitable circuitry such as a field effect transistor (FET)). Also in the embodiment of FIG. 1, the switch control logic 14 is responsive to a spin-down control signal 30 which may be generated during normal operation of the disk drive or during a power failure. During the spin-down mode, the BEMF voltage generated by the windings of the spindle motor 10 charges a capacitor 32 to generate the crudely filtered internal supply voltage 18 applied to the VCM 6 to park the head 4.

Figure 2:
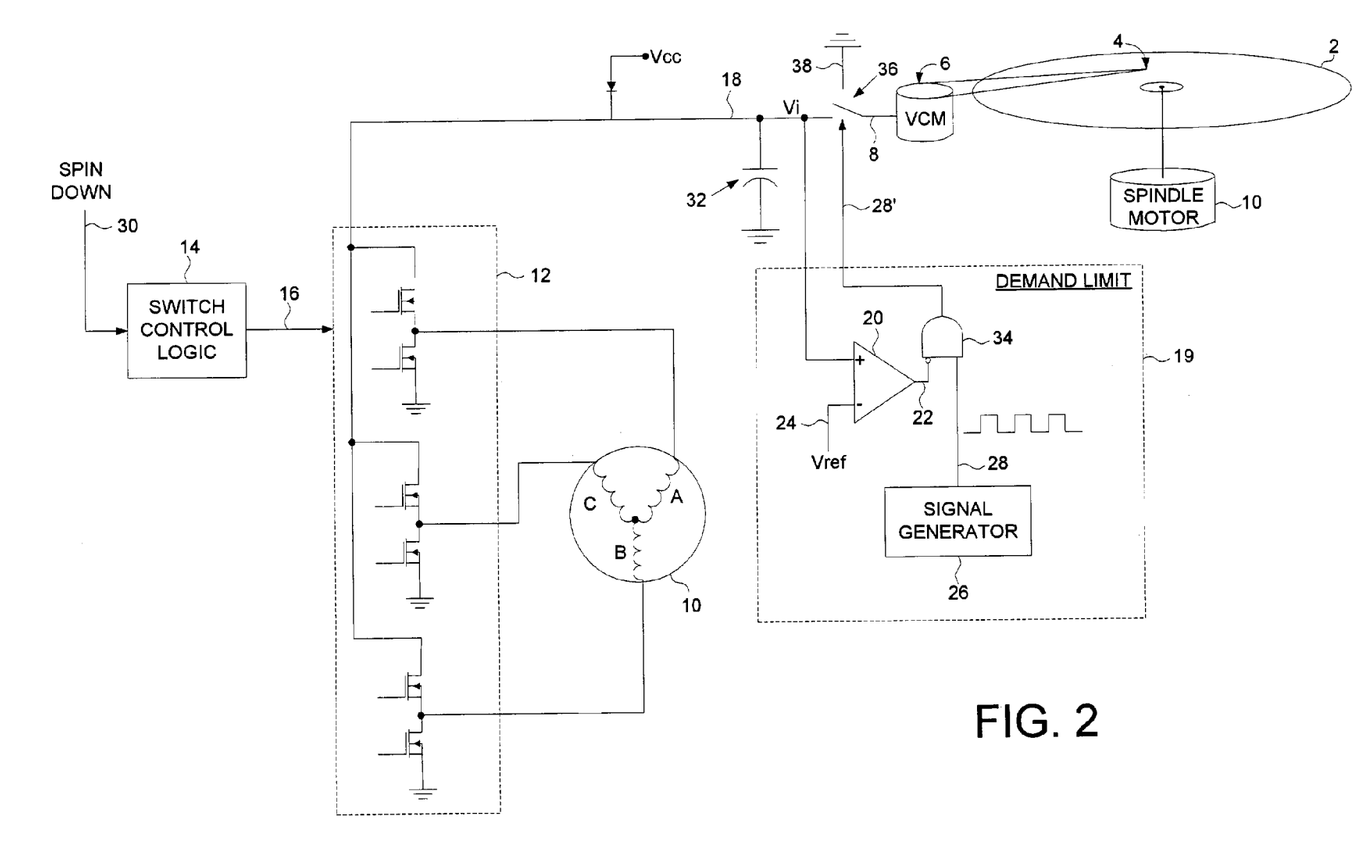
FIG. 2 shows an embodiment of the present invention wherein a PWM demand limit control signal is activated if the internal supply voltage falls below a predetermined threshold.

FIG. 2 shows an embodiment of the present invention wherein if the VCM 6 draws excessive current such that the internal supply voltage 18 falls below the threshold 24, the demand limit control signal 22 is activated. Also in the embodiment of FIG. 2, the periodic signal 28' periodically switches the control input 8 of the VCM 6 between the internal supply voltage 18 and ground 38, thereby grounding the voice coil in the VCM 6 while the internal supply voltage 18 is disconnected from the control input 8. Grounding the voice coil in the VCM 6 helps maintain the load current flow while the internal supply voltage 18 recharges to a level above the threshold 24. Grounding the voice coil in the VCM 6 also helps to brake the VCM 6 which is typically the desired operation when the demand limit circuit 19 is activated, for example, when the VCM 6 is drawing excessive current attempting to brake the VCM 6 when a power failure occurs in the middle of a seek operation. The inductance ratio between the windings in the spindle motor 10 and the voice coil in the VCM motor 6 is preferably selected such that during the voltage recovery period the VCM 6 operates normal or near normal. That is, the inductance of the voice coil in the VCM 6 is selected to be higher than that of the windings in the spindle motor 10 so that the transient response of the VCM 6 is much slower than that of the spindle motor 10.

Periodically switching the control input 8 of the VCM 6 between the internal supply voltage 18 and ground 38 allows the capacitor 32 to recharge while still providing an average voltage to the VCM 6 to continue the park operation. In one embodiment, a frequency of the periodic signal 28 is selected to be high enough so as to avoid audible acoustic noise that may be caused by the switching action of switch 36.

Figure 3:
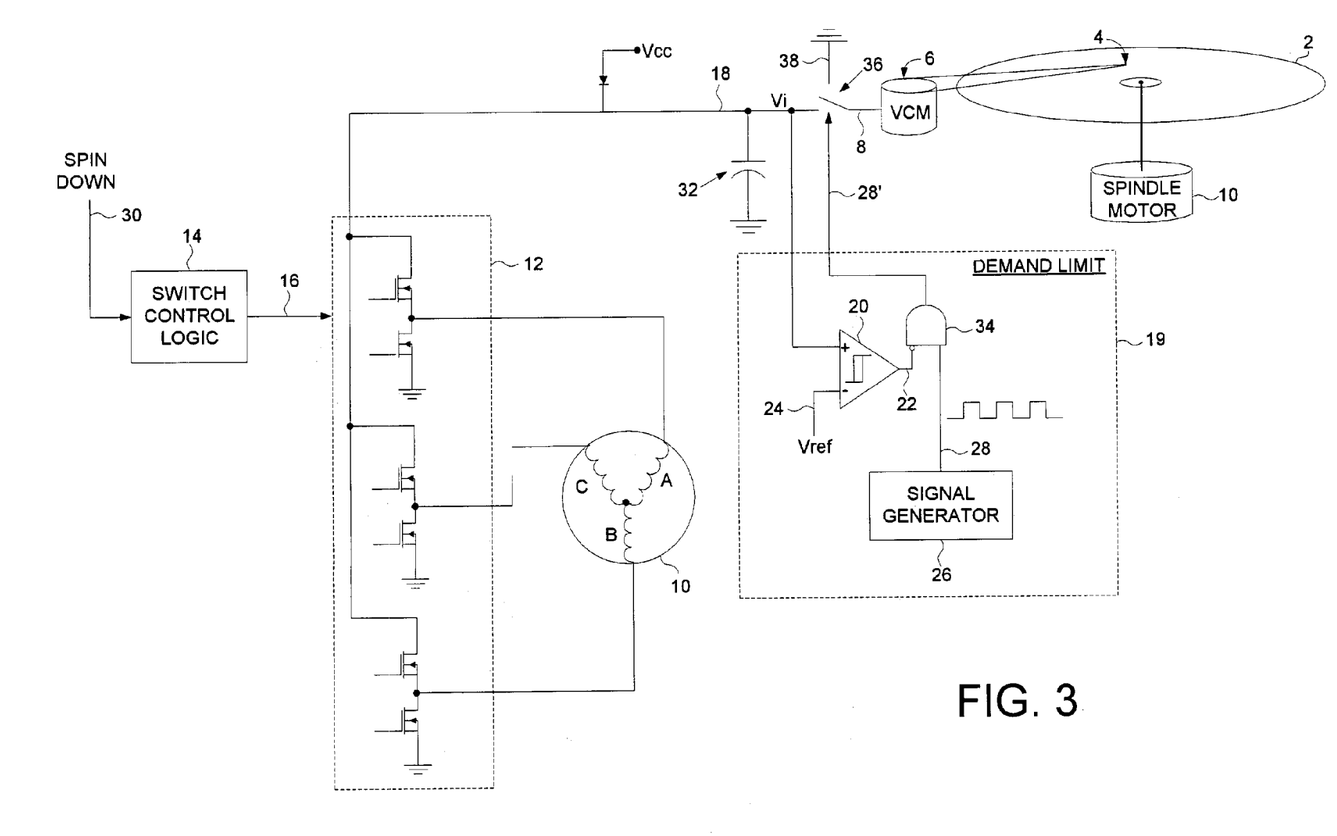
FIG. 3 shows an embodiment of the present invention wherein the PWM demand limit control signal is activated/deactivated by a hysteretic comparator comparing the internal supply voltage to a first and second threshold.

In the embodiment of FIG. 2, the comparator 20 exhibits essentially no hysteresis, however the periodic signal 28 completes at least one full cycle before being disabled by the demand limit control signal 22 (once the internal supply voltage 18 rises above the threshold 24). In an alternative embodiment, the comparator 20 comprises hysteresis such that the demand limit control signal 22 is activated when the internal supply voltage 18 falls below a first threshold, and the demand limit control signal 22 is deactivated when the internal supply voltage 18 rises above a second threshold greater than the first threshold. This embodiment is illustrated in FIG. 3 which employs a hysteretic comparator 20 operating according to a first and second threshold.

Figure 4:
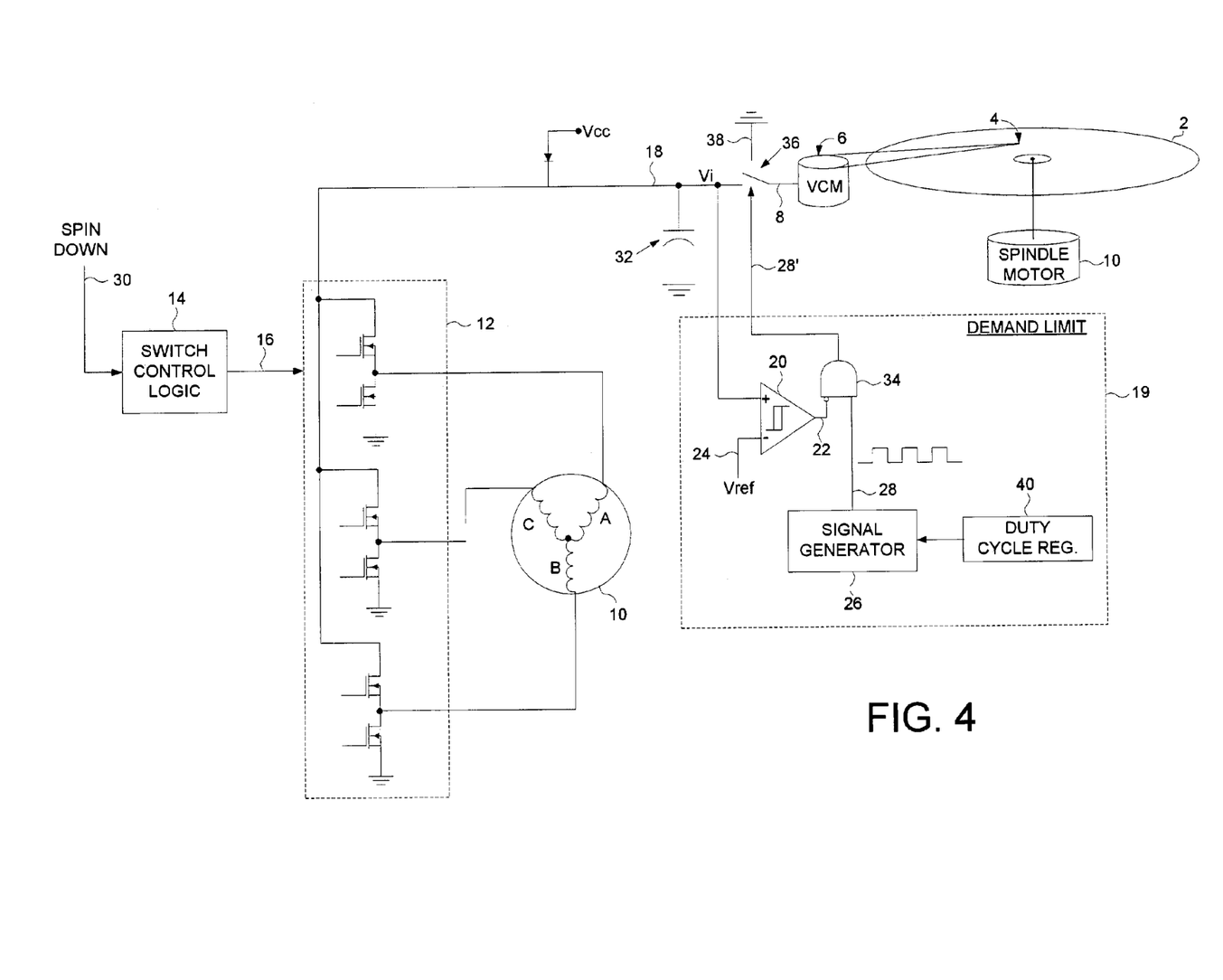
FIG. 4 shows an embodiment of the present invention wherein a duty cycle of the PWM demand limit control signal is programmable.

The signal generator 26 may generate any suitable periodic signal 28 such as a pulse width modulated (PWM) periodic signal 28 wherein the duty cycle is adjusted in order to control the amount of current drawn by the VCM 6 from the internal supply voltage 18. In one embodiment, the duty cycle of the periodic signal 28 is fixed, and in another embodiment, the duty cycle is programmable as shown in the embodiment of FIG. 4 wherein the signal generator 26 is responsive to a programmable duty cycle register 40. In one embodiment, the duty cycle of the periodic signal 28 is programmably adapted to the characteristics of each disk drive. In yet another embodiment, the duty cycle of the periodic signal 28 is adjusted throughout various phases of the park operation. For example, the park operation may involve a first phase wherein the actuator arm is moved to a latch (or to a ramp), and a second phase wherein the actuator arm is latched (or pushed up the ramp). In each of these phases the VCM 6 may require a different amount of driving current and therefore a correspondingly different duty cycle for the periodic signal 28. In yet another embodiment disclosed below with reference to FIG. 10 the duty cycle of the periodic signal 28 is adjusted in response to an amplitude of the internal supply voltage 18 so as to maintain a proper amount of drive current applied to the VCM 6 even though the amplitude of the internal supply voltage 18 may be fluctuating.

Figure 5:
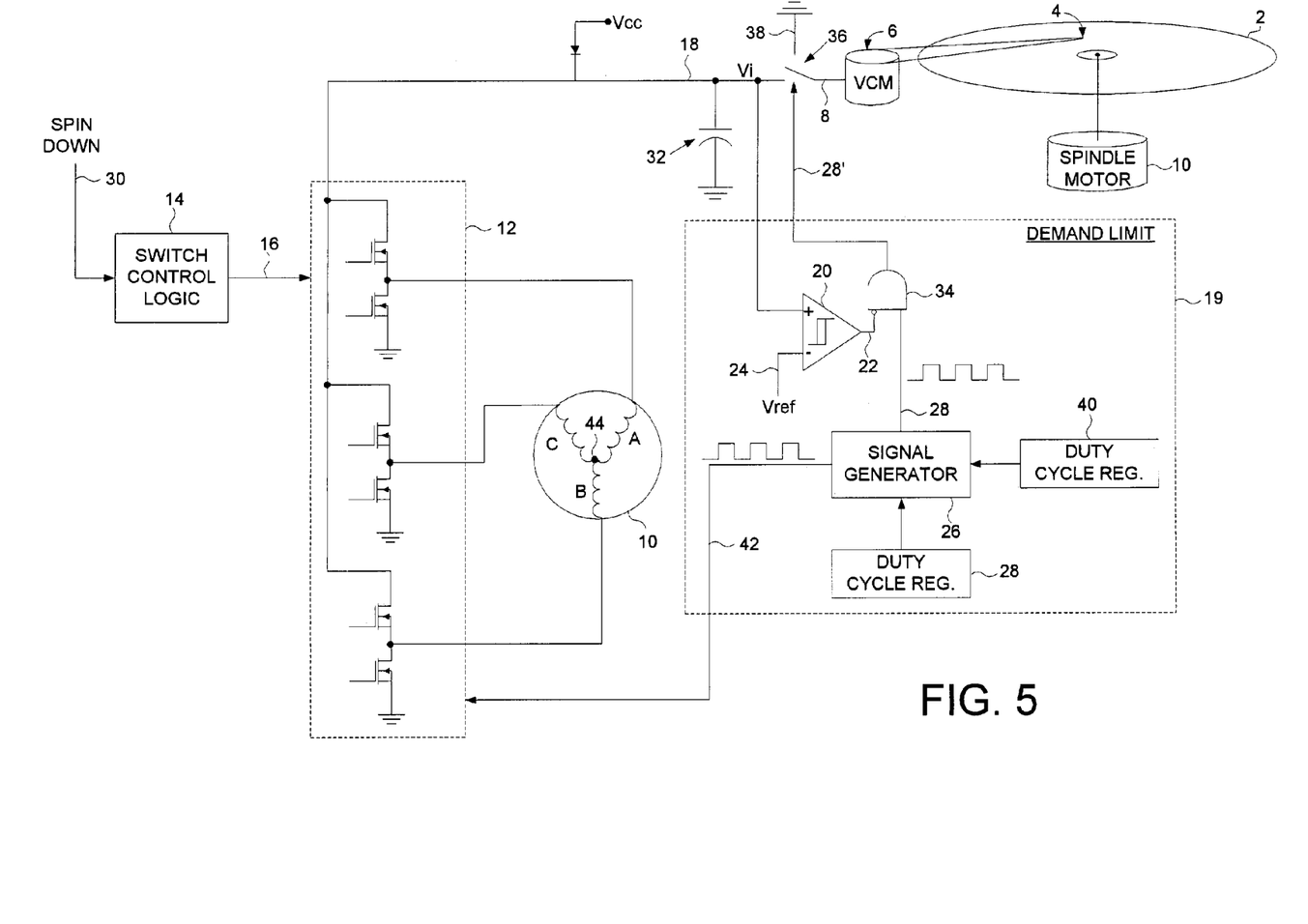
FIG. 5 shows an embodiment of the present invention wherein the windings of the spindle motor are periodically grounded to boost the internal supply voltage.

FIG. 5 shows an embodiment of the present invention wherein the windings of the spindle motor 10 are periodically grounded in order to boost the internal supply voltage 18 and break the spindle motor 10. The signal generator 26 generates periodic signal 42 which periodically grounds the windings of the spindle motor 10 by turning on the lower (ground-side) switching element 12 connected to each winding. In an alternative embodiment, the periodic signal 42 grounds the center tap 44 of the windings. Grounding the windings of the spindle motor 10 causes current to build in the windings which is then transferred to the capacitor 32 in order to boost the internal supply voltage 18.

Figure 6:
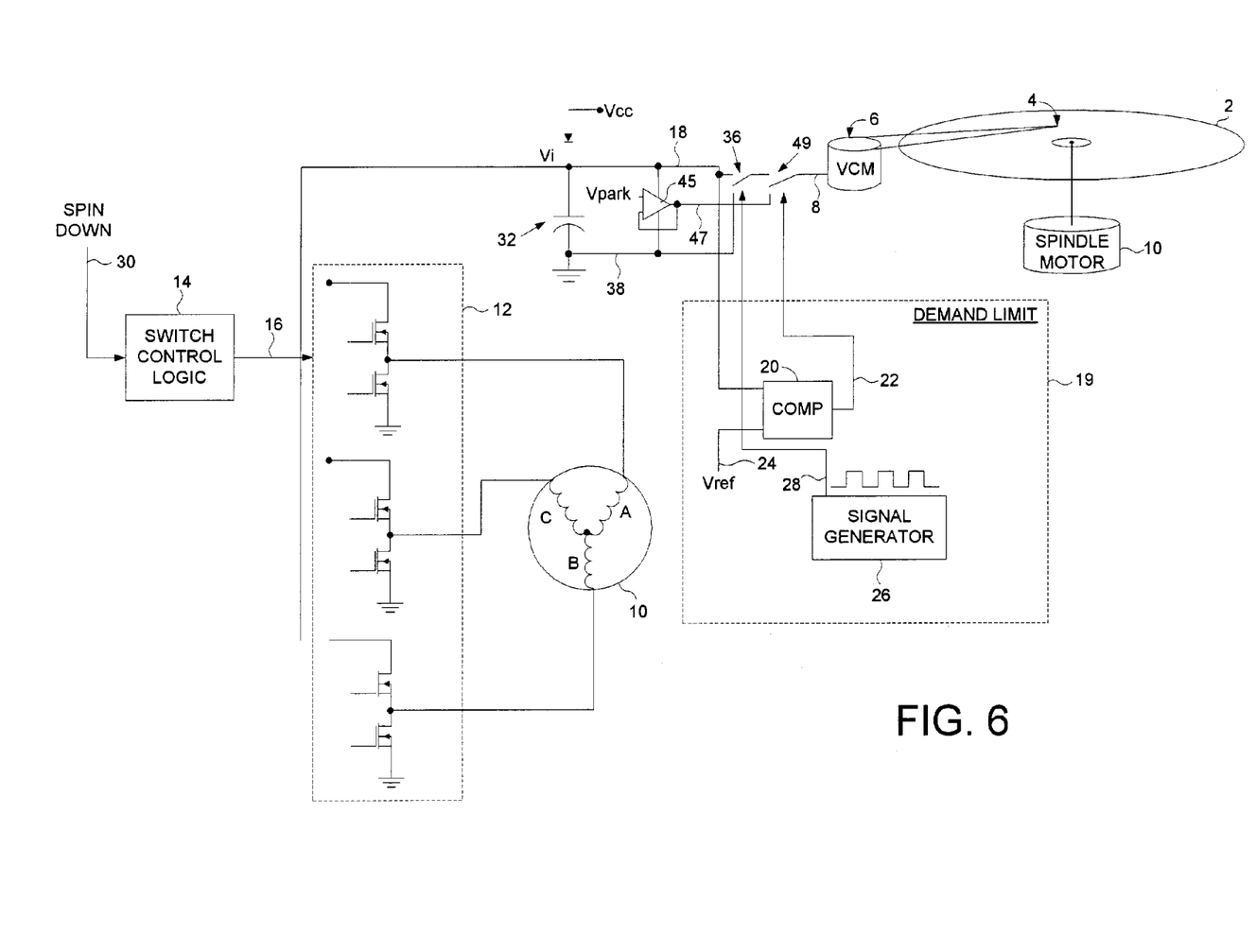
FIG. 6 shows an embodiment wherein the VCM is driven by a regulated voltage generated from the internal supply voltage while the demand limit circuit is deactivated.

FIG. 6 shows a disk drive according to an embodiment of the present invention comprising a voltage regulator 45, responsive to the internal supply voltage 18, for generating a regulated voltage 47 applied to the control input 8 of the VCM 6 while the demand limit control signal 22 is deactivated. The periodic signal 28 periodically switches switch 36 between the internal supply voltage 18 and ground 38. While the demand limit control signal 22 is active, switch 49 connects the output of switch 36 to the control input 8 of the VCM 6. When the demand limit control signal 22 is deactivated by comparator 20, switch 49 connects the control input 8 of the VCM 6 to the linear voltage 47 output by the voltage regulator 45.

Figure 7:
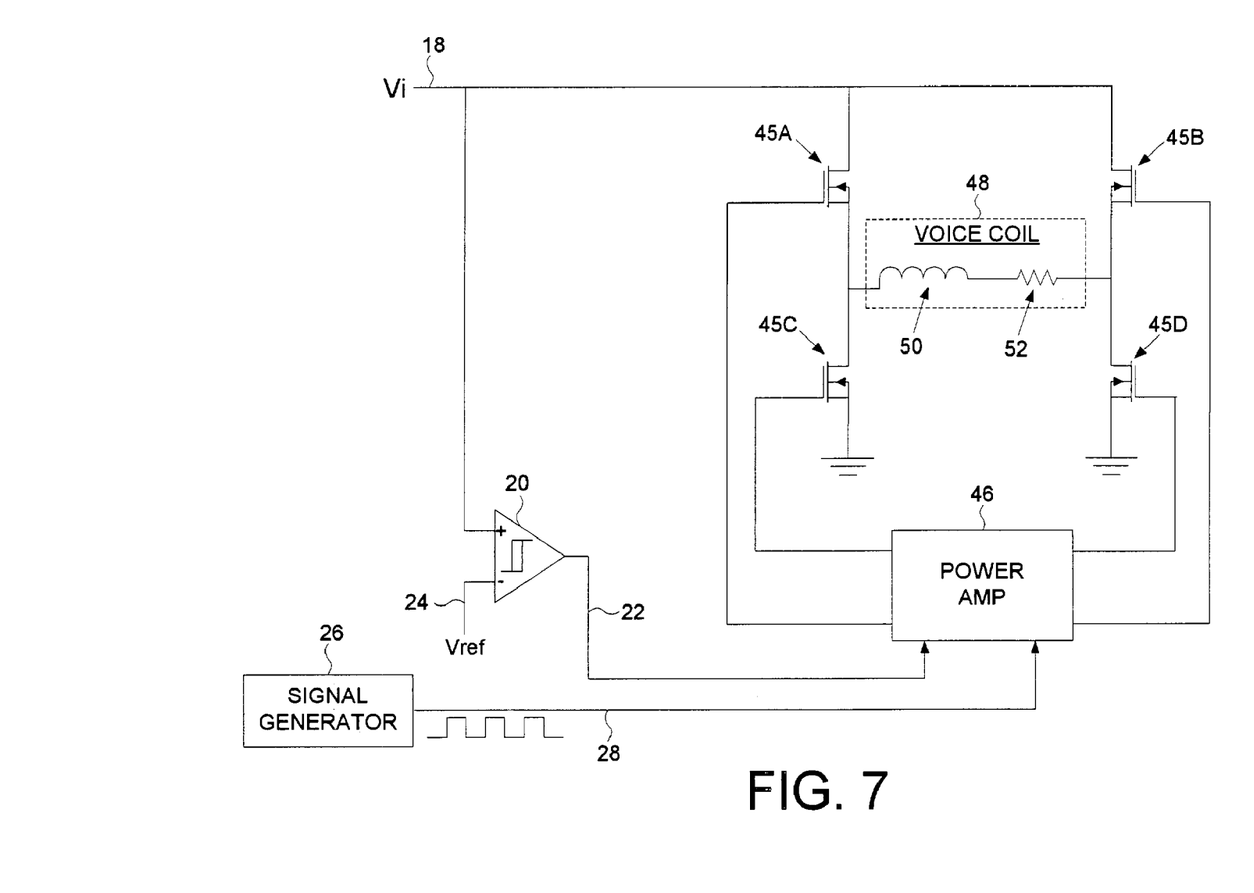
FIG. 7 shows an embodiment of the present invention wherein the voltage regulator of FIG. 6 is implemented by driving the switches of an H-bridge driver in a linear mode.

FIG. 7 shows details of a VCM 6 and attendant VCM driver circuitry according to an embodiment of the present invention for implementing the voltage regulator 45 of FIG. 6. A plurality of switches 45A–45D are controlled by a power amp circuit 46 to form an H-bridge driver with respect to a voice coil 48 comprising an inductive component 50 and a resistive component 52. During the spin-down operation the power amp circuit 46 controls the switches 45A–45D in a PWM mode while the demand limit control signal 22 is active, and in a voltage regulated mode while the demand limit control signal 22 is not active. When driving the VCM 6 in PWM mode, the power amp circuit 46 connects the voice coil directly to the internal supply voltage 18, for example, by turning on switches 45A and 45D and turning off switches 45B and 45C while the periodic signal 28 is high. While the periodic signal 28 is low, the power amp circuit 46 turns on switches 45C and 45D and turns off switches 45A and 45B in order to ground the voice coil 48.

When driving the VCM 6 in the voltage regulated mode, the power amp circuit 46 applies a controlled amount of voltage across the voice coil 48, for example, by turning off switch 45B, turning on switch 45D, and driving switch 45A and 45C in a linear mode so that switch 45A applies a controlled amount of voltage (Vi/X) to the voice coil 48. Driving switches 45A and 45C in a linear mode is much less efficient than driving the VCM 6 in the PWM mode which is why the internal supply voltage 18 drops when driving the VCM 6 in the voltage regulated mode.

Figures 8A, 8B:
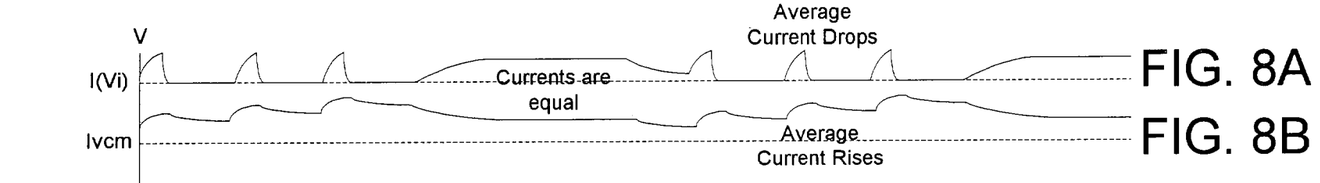
FIGS. 8A–8D show timing diagrams illustrating the operation of the PWM demand limit circuit of FIG. 6.
Figure 8C:
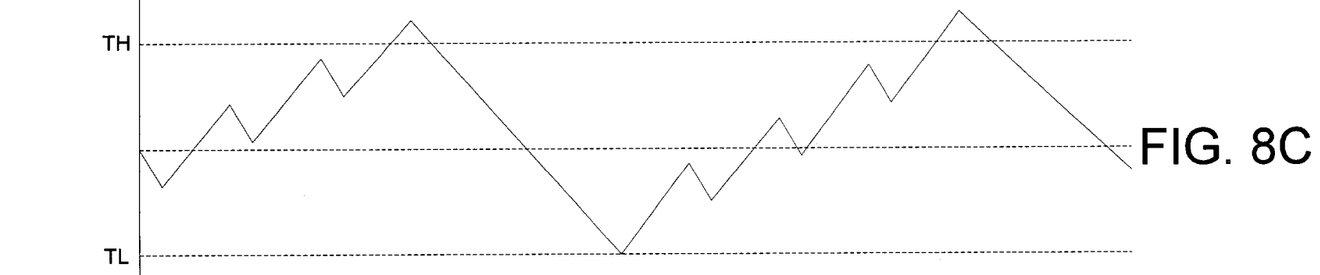
Figure 8D:
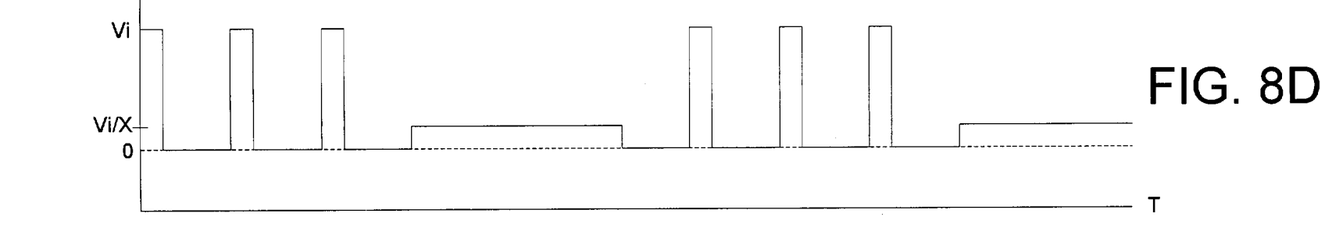

FIGS. 8A–8D show timing diagrams illustrating the voltage regulation mode and PWM mode of driving the VCM 6 during the spin-down operation. The waveform of FIG. 8A represents the current drawn from the internal supply voltage 18, and the waveform of FIG. 8B represents the current flowing through the voice coil 48. The waveform of FIG. 8C represents the amplitude of the internal supply voltage 18, and the waveform of FIG. 8D represents the voltage applied across the voice coil 48. In this embodiment, the comparator 20 comprises hysteresis such that the demand limit control signal 22 is activated when the internal supply voltage falls below threshold TL, and the demand limit control signal 22 is deactivated when the internal supply voltage rises above threshold TH. The demand limit circuit is shown operating initially in PWM mode wherein the periodic signal 28 periodically switches the voice coil 48 between the internal supply voltage 18 (Vi) and ground 38. As shown in FIGS. 8A and 8B, while in the PWM mode the average current drawn from the internal supply voltage 18 drops while the average current flowing through the voice coil 48 rises. The resulting efficiency of the PWM mode causes a reduction in the load on the internal supply voltage, allowing it to rise until it exceeds the threshold TH. The demand limit control signal 22 is then deactivated so that the VCM 6 is driven in the voltage regulation mode wherein a constant voltage (Vi/X) is applied to the voice coil 48. Because the voltage regulation mode is less efficient than the PWM mode, the internal supply voltage 18 begins to fall. When the internal supply voltage 18 falls below the threshold TL, the demand limit control signal 22 is reactivated so that the VCM 6 is again driven in the PWM mode to recharge the internal supply voltage 18. As explained above, the duty cycle of the periodic signal 28 may be adjusted during the spin-down operation in order to vary the average voltage applied to the voice coil 48 during the PWM mode.

In one embodiment, the regulated voltage 47 and/or the duty cycle of the periodic signal 28 are adjusted in response to feedback, such as current feed back using a sense resistor in series with the voice coil 48 or velocity feedback derived from a back EMF voltage detected across the voice coil 48. Using feedback may improve performance of the park operation by maintaining the velocity of the VCM 6 at a desired parking speed, as well as prevent damage to the head 4 when it reaches the parking latch (or ramp).

Figure 9:
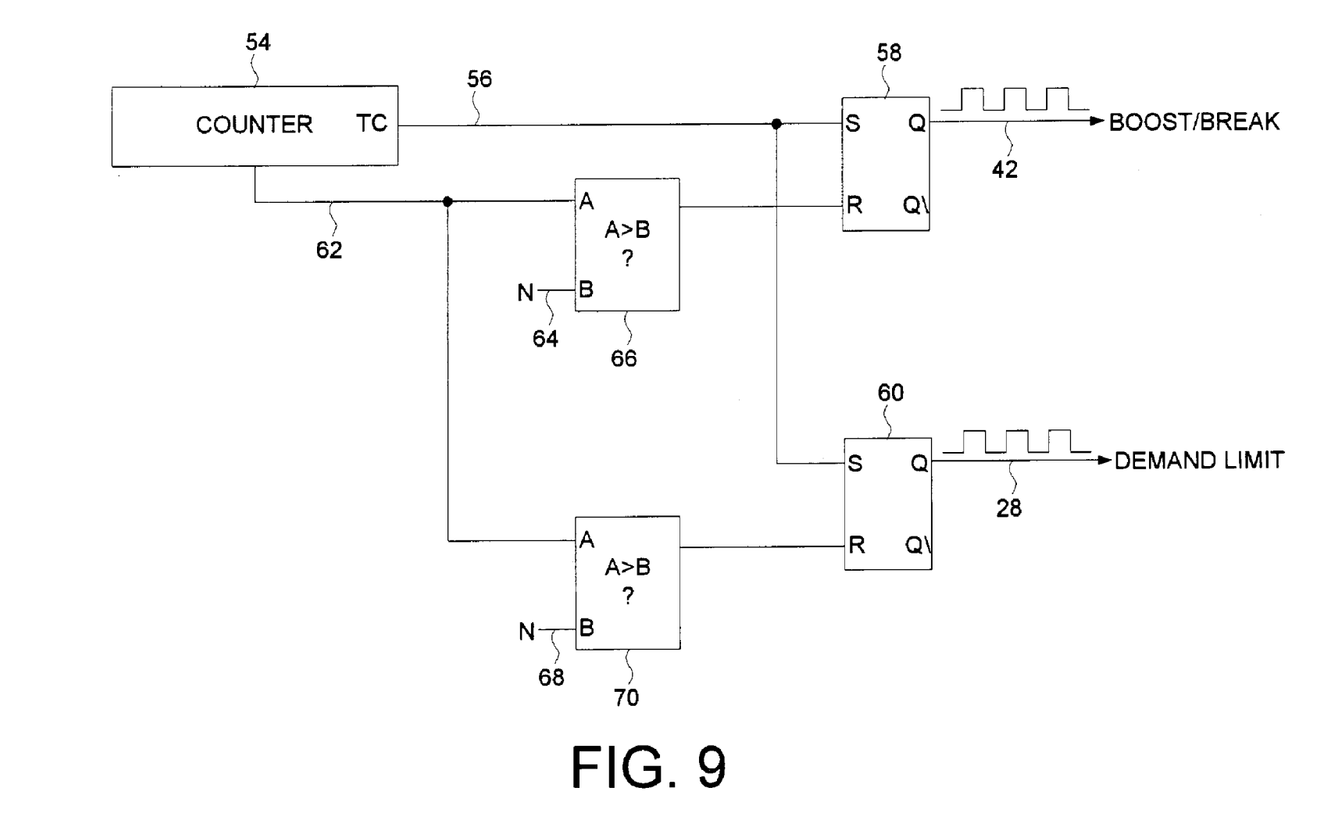
FIG. 9 shows an embodiment of the present invention wherein circuitry is shared to generate the PWM signals for grounding the spindle motor windings and for modulating the demand limit circuit.

FIG. 9 shows an embodiment of the present invention wherein circuitry is shared to generate the periodic signal 42 for grounding the spindle motor windings in order to boost the internal supply voltage 18 and brake the spindle motor 10, and the periodic signal 28 for modulating the demand limit circuit 19. Sharing circuitry has cost advantages, and has the added benefit of allowing synchronized PWM chopping. Synchronization prevents beat frequencies from occurring between the PWM circuits, which can cause audible acoustic noise. A counter 54 is configured to cycle through a predetermined count value. When the counter 54 reaches the terminal count, a TC signal 56 sets a first S/R register 58 and a second S/R register 60 setting both periodic signals 42 and 28 high. The counter 54 is reset and begins counting up. The count value 62 is compared to a first threshold 64 at comparator 66 and to a second threshold 68 at comparator 70. When the count value 62 exceeds the first threshold 64, the comparator 66 resets the first S/R register 58 setting periodic signal 42 low. When the count value 62 exceeds the second threshold 68, the comparator 70 resets the second S/R register 60 setting periodic signal 28 low. One or both of the first and second thresholds 64 and 68 may be programmable in order to adjust the duty cycle of the periodic signals 42 and 28.

Figure 10:
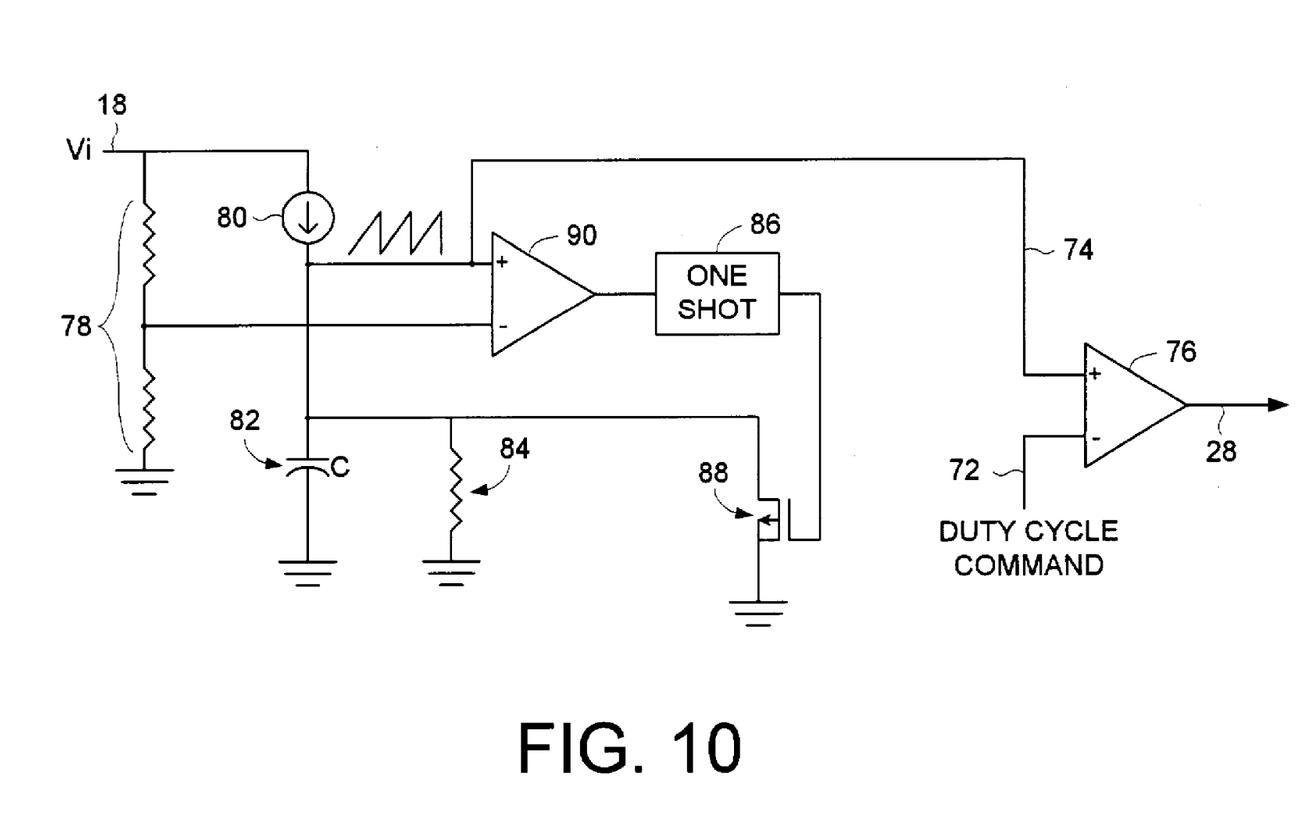
FIG. 10 shows an embodiment of the present invention wherein the duty cycle of the PWM demand limit control signal is adjusted in response to the amplitude of the internal supply voltage.

FIG. 10 shows an embodiment of the present invention wherein the duty cycle of the periodic signal 28 for modulating the demand limit circuit 19 is adjusted in response to the amplitude of the internal supply voltage 18. This embodiment maintains a substantially constant average voltage across the voice coil 48 while driving the VCM 6 in the PWM mode even though the amplitude of the internal supply voltage 18 fluctuates. A duty cycle command 72 is generated for setting a center point value for the duty cycle of periodic signal 28 relative to the desired average voltage applied to the voice coil 48. The duty cycle command 72 is compared to a ramped sawtooth waveform 74 at comparator 76. The ramped sawtooth waveform 76 is generated by a combination of a resistive ladder 78, a current source 80, a capacitor 82, a resistor 84, a one-shot circuit 86, a FET 88, and a second comparator 90. The current generated by the current source 80 is proportional to the amplitude of the internal supply voltage 18. The current generated by the current source 80 is used as a reference current for generating a chop frequency. The current charges the capacitor 82. When the voltage on the capacitor 82 reaches a certain percentage (e.g., 50%) of the internal supply voltage 18 (as set by the resistive ladder 78), the second comparator 90 turns on the one-shot 86, which generates a pulse causing the capacitor 82 to discharge through the FET 88. The frequency of the ramped sawtooth waveform 74 is established by the capacitor 82 and the resistor 84. Peak amplitude of the sawtooth waveform is proportional to the amplitude of the internal supply voltage 18. An increase in the internal supply voltage 18 will cause an increase in the peak amplitude of the sawtooth waveform, and a decrease in the internal supply voltage 18 will cause a decrease in the peak amplitude of the sawtooth waveform.

Comparator 76 compares the sawtooth waveform to the duty cycle command 72 which represents the average voice coil voltage. The output of the comparator 76 is the periodic signal 28 having a varying duty cycle that compensates for variations in the amplitude of the internal supply voltage 18. Operation of FIG. 10 is described by the following equation:

$$Ton/T = Vdc/(KVpwr)$$

where Ton is the on-time of the periodic signal 28, time T is the period of the sawtooth waveform 74, voltage Vdc is the duty cycle command 72, and voltage Vpwr is the peak amplitude of the sawtooth waveform 74. An increase in the peak amplitude of the sawtooth waveform 74 will result in a decrease in the duty cycle of the periodic signal 28, and a decrease in the peak amplitude of the sawtooth waveform will result in an increase in the duty cycle of the periodic signal 28. Further details of this embodiment are disclosed in the above referenced U.S. patent entitled "VOLTAGE FEED FORWARD CONTROL SYSTEM FOR A SPINDLE MOTOR OF A DISK DRIVE".

Figure 11:
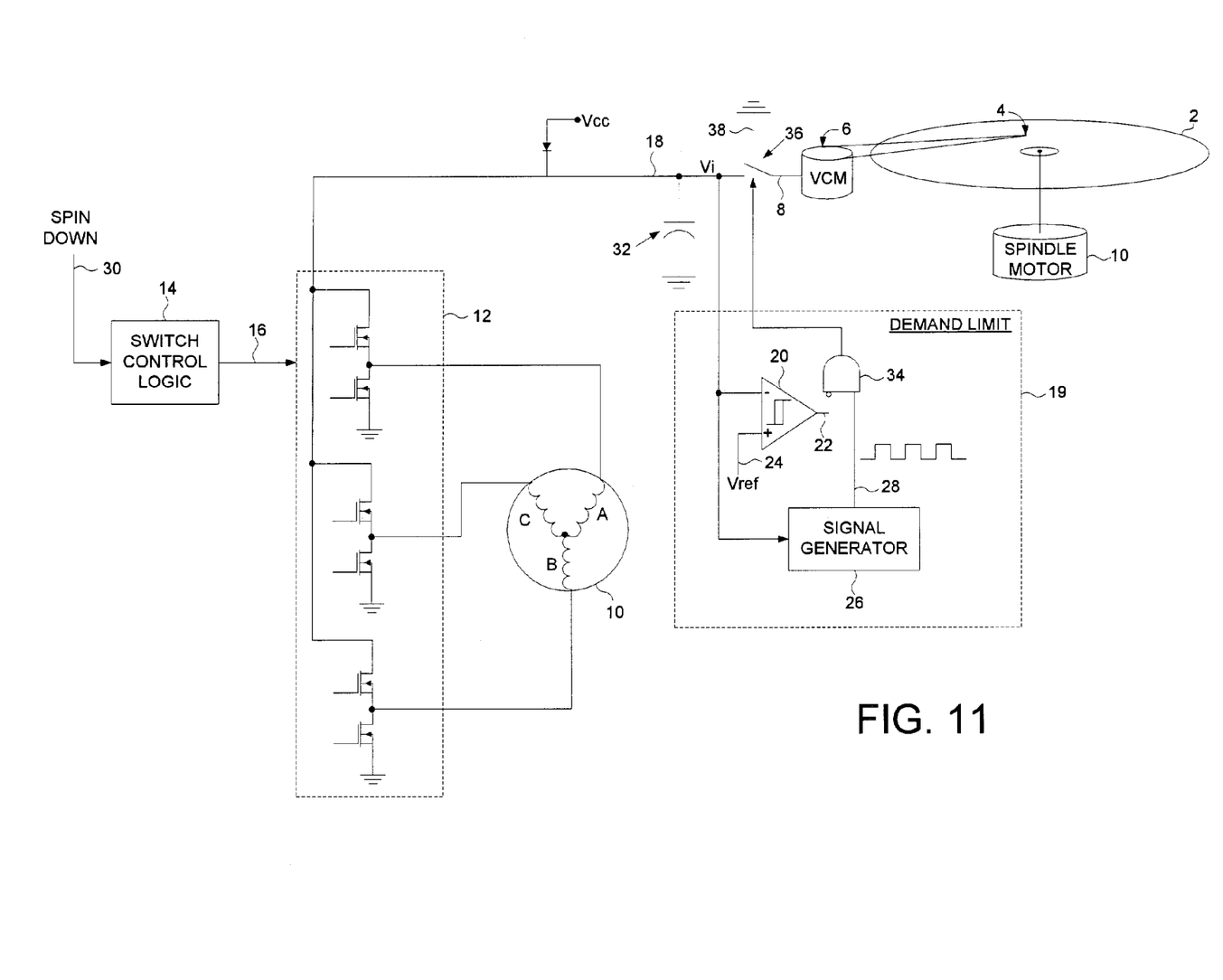
FIG. 11 shows an embodiment of the present invention wherein the PWM demand limit control signal is deactivated if the internal supply voltage falls below a predetermined threshold.

FIG. 11 shows an embodiment of the present invention wherein the VCM 6 is driven in either a PWM mode or grounded. In this embodiment, the signal generator 26 adjusts the duty cycle of the periodic signal 28 in response to the amplitude of the internal supply voltage 18 (as in FIG. 7O) in order to control the average voltage applied to the voice coil 48. If the internal supply voltage 18 falls below the threshold 24, the comparator 20 deactivates the demand limit control signal 22 to disable the periodic signal 28 (via AND gate 34). The control input 8 of the VCM 6 is also connected to ground 38 to allow the internal supply voltage 18 to recharge above the threshold 24, wherein the comparator 20 reactivates the demand limit control signal 22.

Figure 12A:
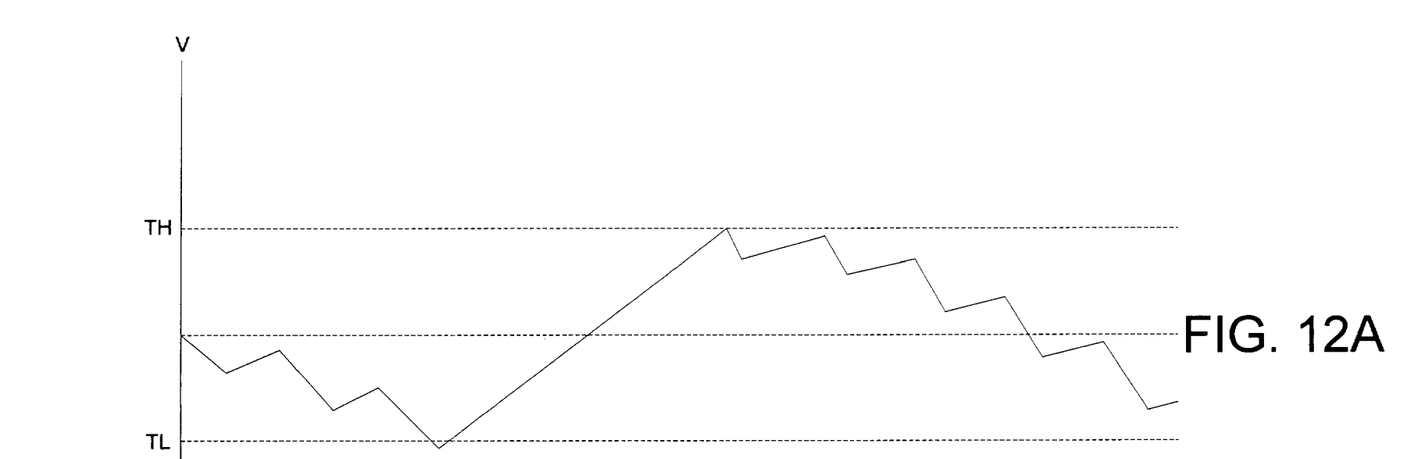
FIGS. 12A–12B show timing diagrams illustrating the operation of the PWM demand limit circuit of FIG. 10.
Figure 12B:
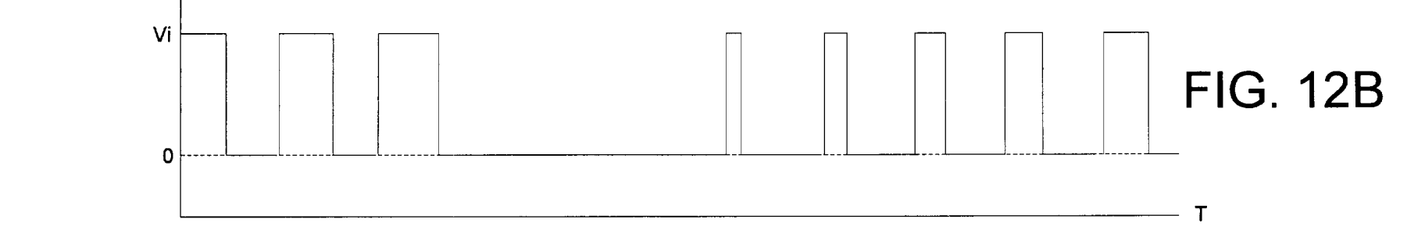

FIGS. 12A–12B show timing diagrams illustrating the operation of the PWM demand limit circuit of FIG. 11 during the spin-down operation, wherein the waveform of FIG. 12A represents the amplitude of the internal supply voltage 18, and the waveform of FIG. 12B represents the voltage applied across the voice coil 48. In this embodiment, the comparator 20 comprises hysteresis such that the demand limit control signal 22 is deactivated when the internal supply voltage falls below threshold TL, and the demand limit control signal 22 is activated when the internal supply voltage rises above threshold TH. When the spin-down operation begins, the internal supply voltage 18 is above the threshold TL therefore the comparator 20 activates the demand limit control signal 22 enabling the periodic signal 28 to PWM the VCM 6 by periodically connecting the control input 8 of the VCM 6 to the internal supply voltage 18 or to ground. This applies a load to the internal supply voltage 18 which causes its amplitude to decrease. As the amplitude of the internal supply voltage 18 decreases, the duty cycle of the periodic signal 28 increases in order to apply a substantially constant average voltage to the voice coil 48. When the internal supply voltage 18 falls below threshold TL, the comparator 20 deactivates the demand limit control signal disabling the periodic signal 28 and connecting the control input 8 of the VCM 6 to ground 38. While the load is disconnected, the internal supply voltage 18 begins to rise. When the internal supply voltage 18 rises above threshold TH, the comparator 20 reactivates the demand limit control signal 22 enabling the periodic signal 28 to again PWM the VCM 6 by periodically connecting the control input 8 of the VCM 6 to the internal supply voltage 18 or to ground.

We claim:

1. A disk drive comprising:
   (a) a disk;
   (b) a head;
   (c) a voice coil motor (VCM) for actuating the head radially over the disk, the VCM having a control input;
   (d) a spindle motor for rotating the disk, the spindle motor comprising a plurality of windings and a rotor rotatable at a variable spin rate wherein the rotor generates a back EMF (BEMF) voltage across the windings proportional to the spin rate of the rotor;
   (e) a plurality of switching elements coupled to the windings;
   (f) switch control logic for generating switch control signals applied to the switching elements for commutating the spindle motor during normal operation and for generating an internal supply voltage from the BEMF voltage during a spin-down mode, the internal supply voltage applied to the control input of the VCM for parking the head; and
   (g) a demand limit circuit for controlling the amount of current drawn by the VCM from the internal supply voltage while parking the head, the demand limit circuit comprising:
      a comparator for comparing the internal supply voltage to a threshold to activate a demand limit control signal; and
      a signal generator for generating a periodic signal for periodically disconnecting the internal supply voltage from the control input of the VCM while the demand limit control signal is active.

2. The disk drive as recited in claim 1, wherein the periodic signal periodically switches the control input of the VCM between the internal supply voltage and ground.

3. The disk drive as recited in claim 2, wherein the comparator activates the demand limit control signal when the internal supply voltage falls below the threshold and deactivates the demand limit control signal when the internal supply voltage rises above the threshold.

4. The disk drive as recited in claim 3, wherein the comparator comprises hysteresis such that the demand limit control signal is activated when the internal supply voltage falls below a first threshold, and the demand limit control signal is deactivated when the internal supply voltage rises above a second threshold greater than the first threshold.

5. The disk drive as recited in claim 2, wherein the comparator deactivates the demand limit control signal when the internal supply voltage falls below the threshold and activates the demand limit control signal when the internal supply voltage rises above the threshold.

6. The disk drive as recited in claim 1, wherein the signal generator pulse width modulates the periodic signal in response to a programmable duty cycle value.

7. The disk drive as recited in claim 1, wherein the signal generator pulse width modulates the periodic signal in response to the internal supply voltage.

8. The disk drive as recited in claim 1, wherein the windings of the spindle motor are periodically grounded in order to boost the internal supply voltage.

9. The disk drive as recited in claim 1, further comprising a voltage regulator responsive to the internal supply voltage for generating a regulated voltage, wherein the regulated voltage is applied to the control input of the VCM while the demand limit control signal is deactivated.

10. A method of operating a disk drive, the disk drive comprising a disk, a head, a voice coil motor (VCM) for actuating the head radially over the disk, the VCM having a control input, a spindle motor for rotating the disk, the spindle motor comprising a plurality of windings and a rotor rotatable at a variable spin rate wherein the rotor generates a back EMF (BEMF) voltage across the windings proportional to the spin rate of the rotor, a plurality of switching elements coupled to the windings, and switch control logic for generating switch control signals applied to the switching elements for commutating the spindle motor during normal operation and for generating an internal supply voltage from the BEMF voltage during a spin-down mode, the internal supply voltage applied to the control input of the VCM for parking the head, the method comprising the steps of:
   (a) comparing the internal supply voltage to a threshold in order to activate a demand limit control signal; and
   (b) generating a periodic signal for periodically disconnecting the internal supply voltage from the control input of the VCM while the demand limit control signal is active.

11. The method as recited in claim 10, further comprising the step of periodically switching the control input of the VCM between the internal supply voltage and ground.

12. The method as recited in claim 11, wherein the demand limit control signal is activated when the internal supply voltage falls below the threshold and deactivated when the internal supply voltage rises above the threshold.

13. The method as recited in claim 12, wherein the demand limit control signal is activated when the internal supply voltage falls below a first threshold, and the demand limit control signal is deactivated when the internal supply voltage rises above a second threshold greater than the first threshold.

14. The method as recited in claim 11, wherein the demand limit control signal is deactivated when the internal supply voltage falls below the threshold and activated when the internal supply voltage rises above the threshold.

15. The method as recited in claim 10, further comprising the step of pulse width modulating the periodic signal in response to a programmable duty cycle value.

16. The method as recited in claim 10, further comprising the step of pulse width modulating the periodic signal in response to the internal supply voltage.

17. The method as recited in claim 10, further comprising the step of periodically grounding the windings of the spindle motor in order to boost the internal supply voltage.

18. The method as recited in claim 10, further comprising the steps of:
(a) generating a regulated voltage in response to the internal supply voltage; and
(b) applying the regulated voltage to the control input of the VCM while the demand limit control signal is deactivated.

* * * * *